United States Patent [19]
Wadell

[11] Patent Number: 5,520,100
[45] Date of Patent: May 28, 1996

[54] GARNITURE APPLYING APPARATUS

[75] Inventor: Lars G. A. Wadell, Aengelholm, Sweden

[73] Assignee: Nestec S.A., Vevey, Switzerland

[21] Appl. No.: 17,013

[22] Filed: Feb. 12, 1993

[30] Foreign Application Priority Data

Mar. 30, 1992 [EP] European Pat. Off. ............. 92105432

[51] Int. Cl.⁶ ..................................................... A21C 9/04
[52] U.S. Cl. ........................ 99/450.1; 99/450.7; 99/494
[58] Field of Search ............................. 99/450.1, 450.7, 99/494; 118/16, 24

[56] References Cited

U.S. PATENT DOCUMENTS

| | | | |
|---|---|---|---|
| 2,611,327 | 9/1952 | Rudolph | 99/450.7 |
| 2,679,309 | 5/1954 | Reading. | |
| 3,358,618 | 12/1967 | Vetta | 99/450.1 |
| 3,408,689 | 11/1968 | Heiner. | |
| 3,526,743 | 9/1970 | Spisak. | |
| 3,633,489 | 1/1972 | Spoelhof | 99/450.1 |
| 3,662,677 | 5/1972 | Westling | 99/450.1 |
| 3,908,584 | 9/1975 | Raque | 118/16 |
| 4,101,284 | 7/1978 | Difiglio et al.. | |
| 4,112,834 | 9/1978 | Thiry | 99/450.1 |
| 4,150,751 | 4/1979 | Romagnoli. | |
| 4,152,976 | 5/1979 | Kawasaki et al. | 99/450.1 |
| 4,167,091 | 9/1979 | Ruppert et al.. | |
| 4,334,464 | 6/1982 | Shinriki | 99/450.7 |
| 4,597,358 | 7/1986 | Aitken | 118/24 |
| 4,715,275 | 12/1987 | Getman | 99/450.1 |
| 4,733,520 | 3/1988 | Rabbi. | |
| 4,733,803 | 3/1988 | Sisson et al.. | |
| 4,962,699 | 10/1990 | Karlsson et al.. | |
| 5,121,677 | 6/1992 | LeClaire et al. | 99/450.1 |

FOREIGN PATENT DOCUMENTS

| | | |
|---|---|---|
| 0476162A1 | 3/1992 | European Pat. Off.. |
| 2369904 | 6/1978 | France. |
| 485507 | 3/1970 | Switzerland. |
| 1048827 | 11/1966 | United Kingdom. |

Primary Examiner—David Scherbel
Assistant Examiner—James F. Hook
Attorney, Agent, or Firm—Vogt & O'Donnell

[57] ABSTRACT

A garniture applying apparatus includes a container having a wall, which circumscribes a container interior, and a base, which has a plurality of cavities for feeding garniture from the container interior through the base. A housing is affixed to the container adjacent the base, and positioned within the housing is at least one slidably reciprocable plate having a plurality of apertures positioned so that, upon reciprocation of the plate, the apertures reciprocate into and out of alignment with the base cavities to open and close the base cavities for feeding garniture from the cavities through the plate. A plurality of flexible tubes are attached to the housing for receiving garniture from the plate, each tube being in alignment with a respective one of the base cavities and extending away from the housing to a fixed end positioned for depositing garniture. An oscillatory frame is attached to the housing for oscillating the housing, plate and container and introducing garniture from the container interior into the base cavities.

7 Claims, 1 Drawing Sheet

GARNITURE APPLYING APPARATUS

BACKGROUND OF THE INVENTION

The present invention relates to an apparatus for applying solid pieces of garniture to a food product, especially applying a pizza garniture to pizza shells.

Existing "at random" applicators for applying garniture to pizza shells cover the whole pizza surface in one operation and it is very difficult to obtain a satisfactory and even coverage over the whole surface.

SUMMARY OF THE INVENTION

The present invention provides an apparatus for applying garniture to a pizza by means of which the garniture is applied to sections of the pizza surface and whereby even if the coverage of each section is not perfect, the total coverage is superior to that obtained by existing applicators.

According to the present invention there is provided an apparatus for applying garniture to pizza shells which comprises a container whose base is provided with a plurality of cavities each cavity having an aperture in its base and extending downwards from each of which is a flexible tube, and means for opening and closing the apertures.

In particular, the garniture applying apparatus of the invention comprises a container having a wall, which circumscribes a container interior, and a base having a plurality of cavities for feeding garniture from the container interior through the base; a housing affixed with the container adjacent the base and at least one slidably reciprocable plate positioned within the housing, the plate having a plurality of apertures positioned so that, upon reciprocation of the plate, the apertures reciprocate into and out of alignment with the base cavities to open and close the base cavities for feeding garniture from the cavities through the plate; a plurality of flexible tubes attached to the housing for receiving garniture from the plate, each tube being in alignment with a respective one of the base cavities and extending away from the housing to a fixed end positioned for depositing garniture; and an oscillatory frame attached to the housing for oscillating the housing, plate and container and introducing garniture from the container interior into the base cavities.

The present invention also provides a process for applying garniture to a pizza shell which comprises feeding the garniture to a container having in its base a plurality of apertures extending downwards from which are a plurality of flexible tubes and means for opening and closing the apertures, whereby, when the apertures are opened, portions of the garniture pass through the apertures and through the flexible tubes onto the pizza shell below.

The means for opening and closing the apertures in the base of the cavities may be provided by one or more plates having a plurality of holes, positioned below the apertures in the bases of the cavities and adapted to slide to bring the holes into or out of alignment with the apertures in the base of the cavities.

The base of the container may be of any desired shape or size and the apertures in the bases of the cavities may be arranged in any desired pattern. The number of cavities may vary but conveniently there may be from 3 to 15 and preferably from 6 to 12 cavities. The size of the cavities may vary according to requirements and it may be possible to distribute solid pieces such as sausage slices or olives etc.

The cavities may be provided in a removable plate in a bottomless container. The plate may be exchangeable with other plates having different numbers and shapes of cavities. The thickness of the plate may be chosen to fit different amounts of garniture.

Advantageously, the container is adapted to oscillate in any pattern of oscillating movement, preferably in a circular movement, in order to even out the garniture contained therein, particularly in each cavity so that each cavity contains a similar amount of garniture.

Preferably, the lower ends of the flexible tubes are fixed in desired adjustable positions which may depend on the shape of the pizza. The lower fixed ends of the flexible tubes may be provided with longitudinally orientated bars made of metal or rigid plastics material which may oscillate or rotate in order to spread the garniture.

The lower outlet ends of the flexible tubes terminate at a position a short distance above the surface of a pizza shell positioned beneath.

Conveniently, an intermittently travelling conveyor belt is provided for transporting the pizza shells consecutively beneath the apparatus of the present invention.

Advantageously, a scraper may be provided for cleaning the apertures in the base of the container after a portion of garniture has been applied to a pizza shell. If desired, a plurality of apparatuses of the present invention may be positioned side by side, preferably on a common oscillating frame so that a plurality of pizzas lying side by side may be supplied with garniture.

BRIEF DESCRIPTION OF THE DRAWINGS

The present invention is further described by way of example only with reference to the accompanying drawings.

DETAILED DESCRIPTION OF THE DRAWINGS

Figure 1:
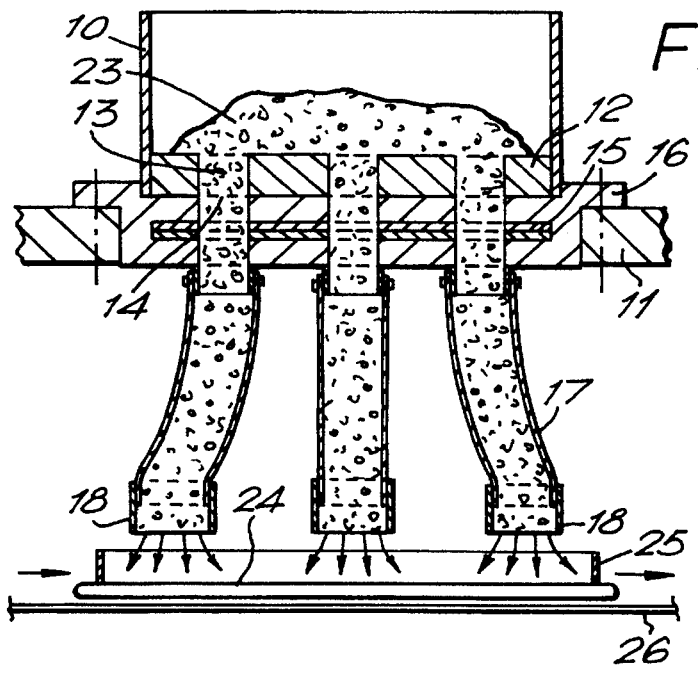
FIG. 1 is a diagrammatic side sectional view of an apparatus according to the invention.
Figure 2:
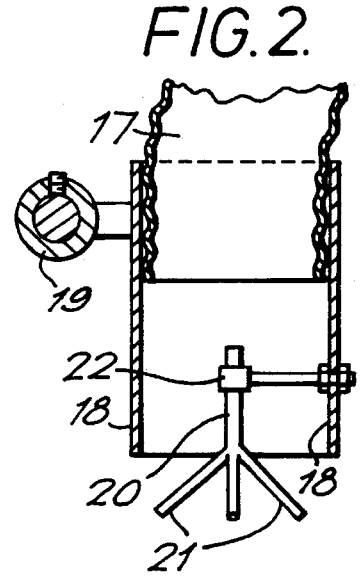
FIG. 2 is a diagrammatic side sectional view of the lower part of a flexible tube.
Figure 3:
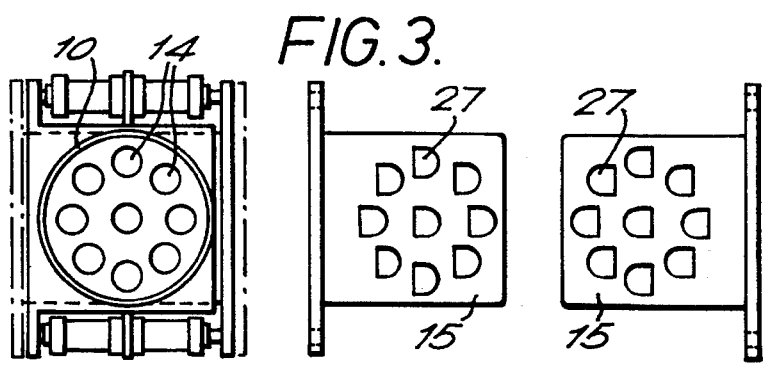
FIG. 3 is a diagrammatic plan view of the apertures in the base of the cavities in the container of the apparatus of FIG. 1, and a pair of sliding plates separated from each other and outside the housing below the container to show the arrangement of the holes.
Figure 4:
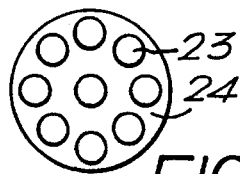
FIGS. 4 through 9 illustrate different shapes of pizza shells which may be supplied with garniture by the apparatus of this invention.
Figure 5:
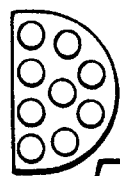
Figure 6:
Figure 7:
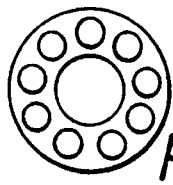
Figure 8:
Figure 9:
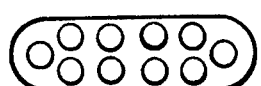

Referring to the drawings, FIGS. 1 and 2 show a container 10 adapted to oscillate by means of an oscillating frame 11 and fitted with a disc 12 provided with nine cavities 13 (three of which are shown), the lower ends of the cavities being provided with apertures 14 beneath which are two superimposed sliding plates 15 each provided with nine holes 27 (three of which are shown in alignment with the apertures 14), sliding within a housing 16. Attached to the housing 16 are nine flexible tubes 17 (three shown) with fixed ends 18 connected to an adjustable support 19. Within the fixed ends is a longitudinally positioned bar 20 extending at its lower end into three projecting bars 21 and connected to a holder 22 within which it can rotate by means (not shown).

Garniture 23 is shown in the container 10 filling the cavities 13 and flowing through the apertures 14, the holes in the sliding plate 15, the flexible tubes 17 and emerging onto a pizza shell 24 surrounded by a metal ring 25 (as described in our co-pending European Patent Application No 90115057.3) transported along a conveyor belt 26 travelling intermittently in the direction of the arrows.

In operation, a weighed 50 g portion of garniture 23 is fed to the container 10 which oscillates to evenly distribute the garniture in the cavities 13 and the plates 15 are in a partly superimposed position with their holes 27 out of alignment with the apertures 14 so that they close the apertures 14. The plates 15 then slide to a completely superimposed position in order to align their holes 27 with the apertures 14 in the lower ends of the cavities 13 whereupon the garniture 23 passes through the open apertures through the flexible tubes 17 and emerges from the fixed ends 18 whose positions have been adjusted by the adjustable support 19 depending on the pizza shape, onto a stationary circular pizza shell 24 having a diameter of 22 cm which has been transported on the intermittently travelling conveyor belt 26. Each longitudinally positioned circular bar 20 rotates within the fixed end 18 of each of the flexible tubes 17 and, together with its projecting bars 21, causes the garniture 23 emerging from each of the flexible tubes to spread over an area of the pizza wider than the area of the lower openings of the fixed ends 18 of the flexible tubes 17 thus covering the pizza shell 24 in a satisfactory even manner.

After the pizza shell 24 has been supplied with the garniture 23, the plates 15 slide in the reverse direction to close the apertures 14, the conveyor belt 26 restarts and conveys the following pizza shell to a position below the apparatus where it stops to enable the garniture to be applied by the procedure described above, and then recontinues.

I claim:

1. A garniture applying apparatus comprising:

container having a wall, which circumscribes a container interior, and a base having a plurality of cavities for feeding garniture from the container interior through the base;

a housing affixed with the container adjacent the base and at least one slidably reciprocable plate positioned within the housing, the plate having a plurality of apertures positioned so that, upon reciprocation of the plate, the apertures reciprocate into and out of alignment with the base cavities to open and close the base cavities for feeding garniture from the cavities through the plate;

a plurality of flexible tubes attached to the housing for receiving garniture from the plate, each tube being in alignment with a respective one of the base cavities and extending away from the housing to a fixed end positioned for depositing garniture; and an oscillatory frame attached to the housing for oscillating the housing, plate and container and introducing garniture from the container interior into the base cavities.

2. An apparatus according to claim 1 wherein there are two slidably reciprocable plates superimposed one to the other in the housing so that, upon reciprocation of the plates in opposite directions with respect to each other, the apertures of each plate reciprocate into and out of alignment to open and close the base cavities.

3. An apparatus according to claim 1 further comprising a plurality of rotatable bars for spreading garniture, each bar positioned, respectively, within the fixed end of a flexible tube.

4. An apparatus according to claim 1 further comprising a plurality of adjustable supports for holding the fixed ends of the flexible tubes.

5. An apparatus according to claim 1 wherein the base has from 3 to 15 cavities.

6. An apparatus according to claim 1 wherein the base is removable from the container.

7. An apparatus according to claim 1 further comprising a conveyor positioned beneath the fixed ends of the flexible tubes for intermittently transporting articles to be garnished.

* * * * *